C. W. & A. W. LANDERS.
PLOW.
APPLICATION FILED FEB. 1, 1909.
942,918.
Patented Dec. 14, 1909.
2 SHEETS—SHEET 1.
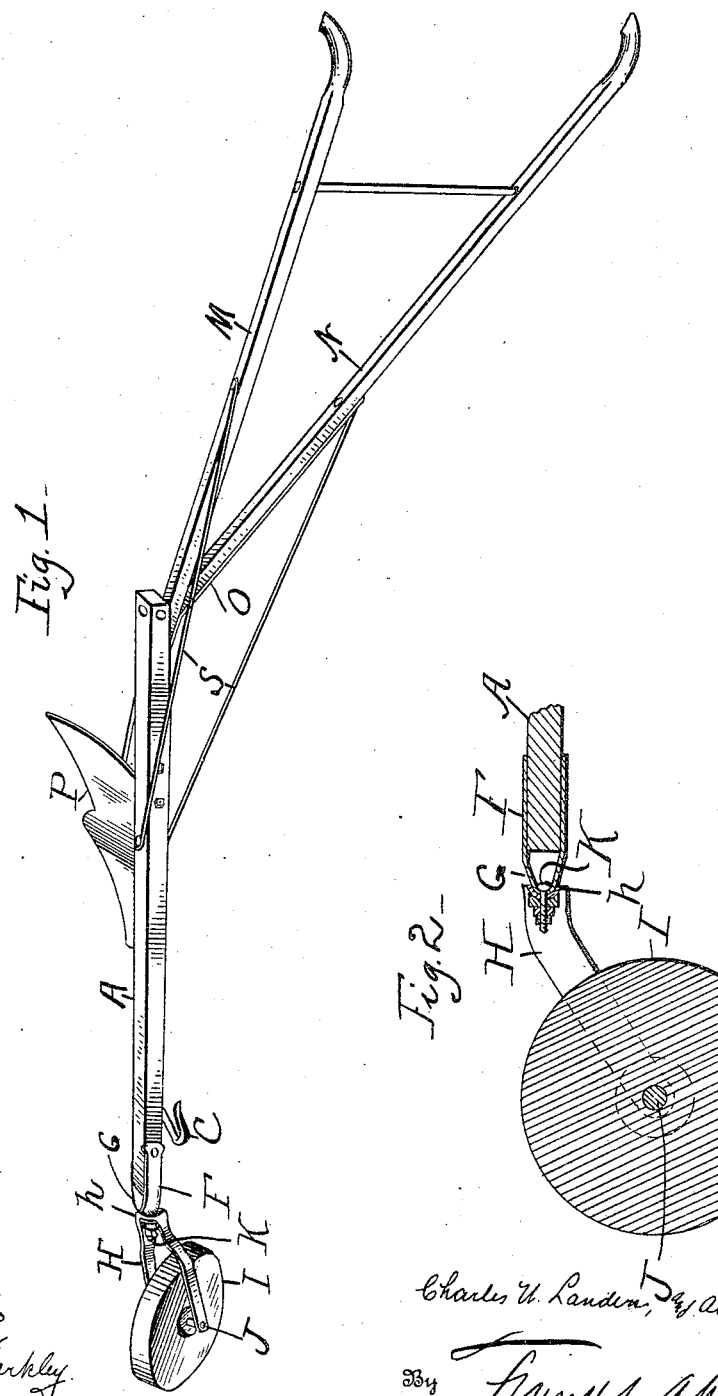

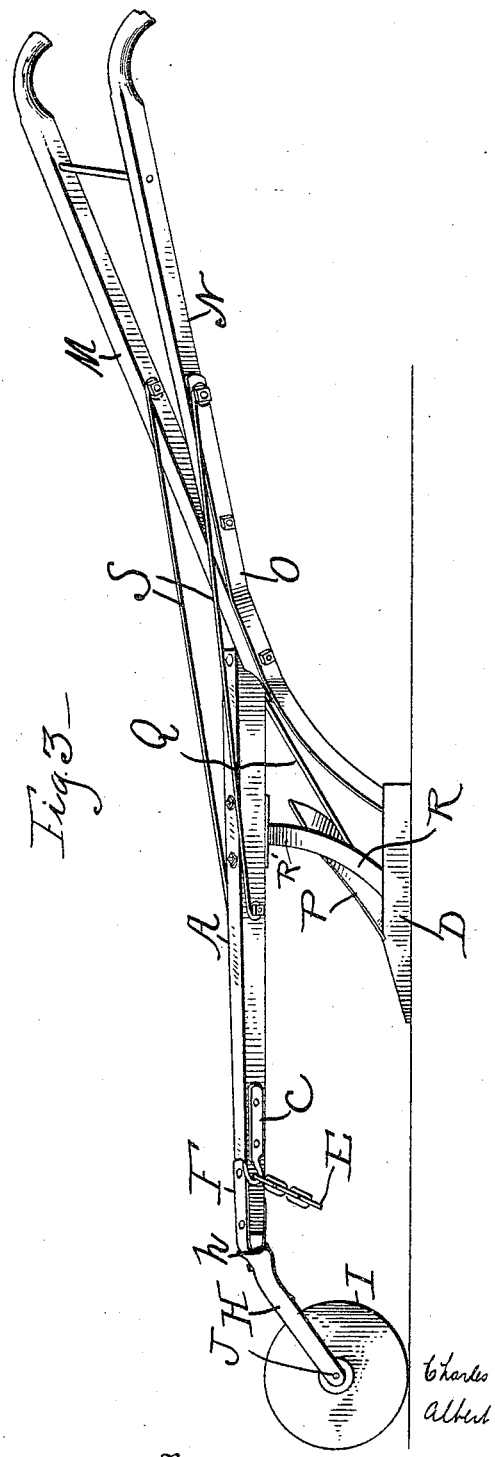

UNITED STATES PATENT OFFICE.

CHARLES W. LANDERS AND ALBERT W. LANDERS, OF HIGHLAND HOME, ALABAMA.

PLOW.

942,918.

Specification of Letters Patent.   Patented Dec. 14, 1909.

Application filed February 1, 1909.   Serial No. 475,348.

*To all whom it may concern:*

Be it known that we, CHARLES W. LANDERS and ALBERT W. LANDERS, citizens of the United States of America, residing at Highland Home, in the county of Crenshaw and State of Alabama, have invented certain new and useful Improvements in Plows, of which the following is a specification.

This invention relates to plows and particularly to a plow designed for use in cultivating orchards, vineyards and for turning soil close to fences, trees and other obstructions which usually prevent cultivation by plows, owing to the fact that the obstructions interfere with travel close enough to the obstruction to render the ordinary plow operative.

An object of this invention is to provide novel means for permitting the operator to travel with the plow and operate it, the path of travel of the operator being in the line parallel with the line of travel of the plow share, means being provided for connecting the handles to the beam of the plow in order that both handles may extend rearwardly, but in a direction diagonal to the length of the beam.

A still further object of this invention is to provide draft rigging connected to the beam of the plow and to point rearwardly of its forward end, means being also provided for bracing the forward end against the pull exerted on the draft rigging, thus preventing the forward end from turning in the direction of the pull on the draft rigging.

A further object of this invention is to provide bracing means for the forward end of a plow beam, the said bracing means being adjustably vertical in order to regulate the depth of the furrow, the said device being rotatable laterally in order that the angle of the bracing means with relation to the axis of the beam, may be changed to increase or diminish the resistance of the device to the pull exerted on the draft rigging.

A still further object of this invention is to provide a plow having its handles extending from the beam thereof at an angle thereto, means being provided for bracing the handles and for connecting the plow share to the beam and handles by a peculiarly constructed standard with necessary bracing, whereby the beam and plow share are drawn out of alinement in order that the plow may operate quite close to the trunk of a tree or to the stems of plants without liability of the beam contacting the plants or trees.

With the foregoing and other objects in view, the invention consists in the details of construction and in the arrangement and combination of parts to be hereinafter more fully set forth and claimed.

In describing the invention in detail, reference will be had to the accompanying drawings, forming part of this specification wherein like characters denote corresponding parts in the several views, in which—

Figure 1 is a top plan view of a plow embodying the invention, handles and beam owing to the particular construction and arrangement of the parts being in perspective. Fig. 2 is a longitudinal sectional view of a fragment of a beam and the parts connected thereto. Fig. 3 illustrates a perspective view of the plow.

In these drawings A denotes a beam having means for attaching a draft rigging thereto, here shown as a hook C attached to the beam at the point back of the forward end of said beam and on the side thereof corresponding to the landside D of the plow. The hook C is provided with a chain E or other flexible connection to which a whiffletree may be connected.

The forward end of the beam is provided with a metallic strap F having a loop G which is rounded to form a ball and socket connection with the forked bracket H in which the wheel I is mounted by means of the pin J. The socket $h$ of the bracket fits on the rounded portion of the loop G and is held in adjusted position thereon by means of the bolt K. By an inspection of Fig. 2, it will be observed that the bracket may be turned on the bolt K as a pivot to change the angle of the wheel I with relation to the beam. When pull is exerted on the draft rigging, the wheel I will be drawn into contact with the soil, but as the wheel travels at an acute angle with relation to the soil, pull exerted on the draft rigging cannot turn the front end of the beam, but on the other hand, the wheel I will act to guide the beam in a straight line. It thus follows, that while the animal which is drawing the plow is off side and is exerting the pull at an angle to the length of the beam, the beam is nevertheless caused to travel in a straight line.

In order to permit the operator to travel practically in line with the animal employed to draw the plow, the handles are offset with relation to the beam and one handle M is connected to the rear end of the beam whereas the other handle N has its end beveled and adapted to abut the handle M, the two handles being connected by means of a metallic strap O, bolted thereto and extended to brace the rear end of the landside D. The mold-board P which is connected to and operates in conjunction with the landside is braced by means of the rod Q extending through the beam. A post R is connected to the beam and to the landside and the construction has been found to withstand the strain incident to its use, said post being crooked laterally near the top, as at R, giving the beam a tilted position, for the purposes stated of permitting cultivation of the soil near the growing plants or trees and obviating the contact of the beam with said plants or trees.

Brace rods S extend from the beam to the handle and are connected thereto by means of bolts as fully shown in the drawing.

We claim—

1. In a plow, a beam having a mold board and landside connected to the beam, a draft rigging connection back of the forward end of the beam and on the side thereof opposite the mold board, handles extending rearwardly and obliquely from the beam, and sidewise draft resisting means comprising a member attached to the beam in front of the point of connection of the draft rigging and having a rounded surface, a forked bracket having a joint connection with said member, a pin forming an axle, a wheel on the pin, the parts being assembled to permit the bracket to be adjusted at an angle with relation to the beam, and the pin forming the axle is inclined.

2. In a plow, a beam having a mold board and landside connected to it, a connection for drawing the plow stationed on the side of the beam back of the forward end of said beam, handles extending rearwardly and sidewise of the beam from the side containing the connection for drawing the plow, and sidewise draft resisting means standing at an incline toward the side containing the connection for drawing the plow, said draft resisting means comprising a member attached to the beam at a point in front of the connection for the draft rigging having a rounded surface, a forked bracket having a socket adjustable on the rounded surface of the member, means for adjustably connecting the forked bracket and member whereby the bracket is adjustable with relation to the beam and the axle of the wheel is inclined thereby.

In testimony whereof, we affix our signatures in the presence of two witnesses.

CHARLES W. LANDERS.
ALBERT W. LANDERS.

Witnesses:
P. A. LANFORD,
E. F. LANFORD.